Nov. 8, 1960   E. C. BAILEY ET AL   2,959,066
MOTOR-TRANSMISSION SYSTEM
Filed Jan. 18, 1945   7 Sheets-Sheet 2
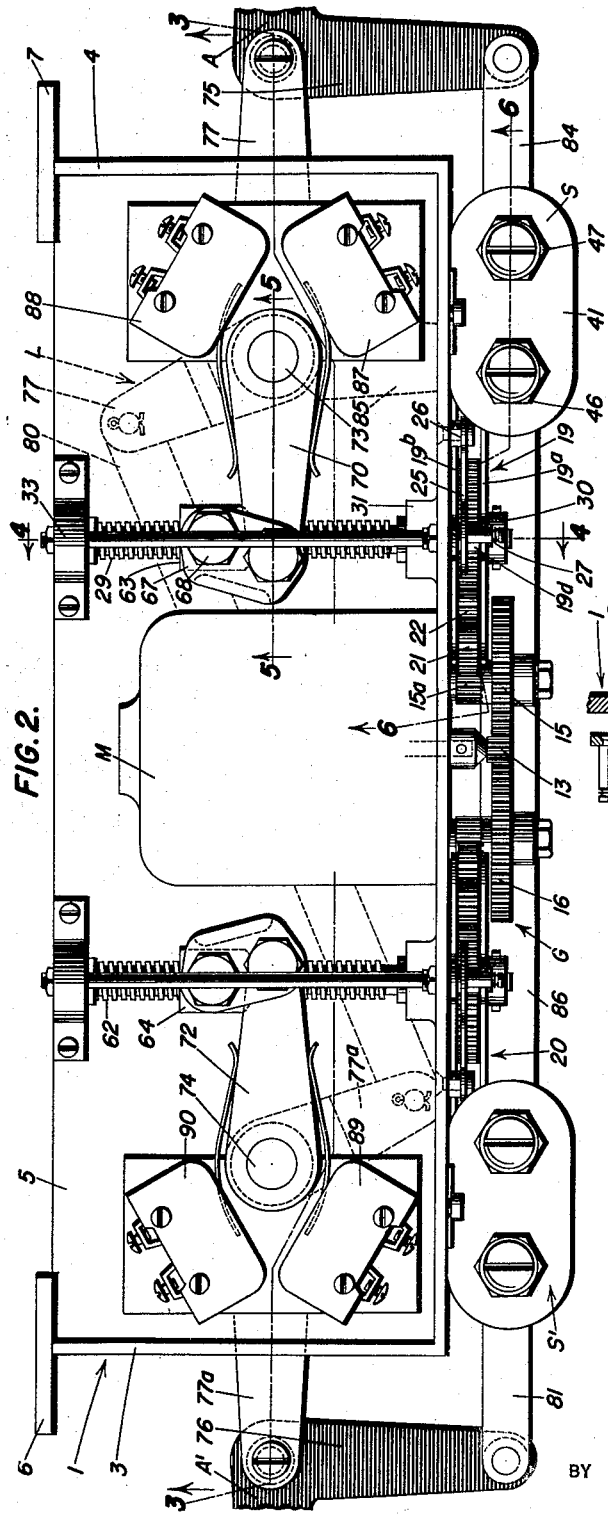
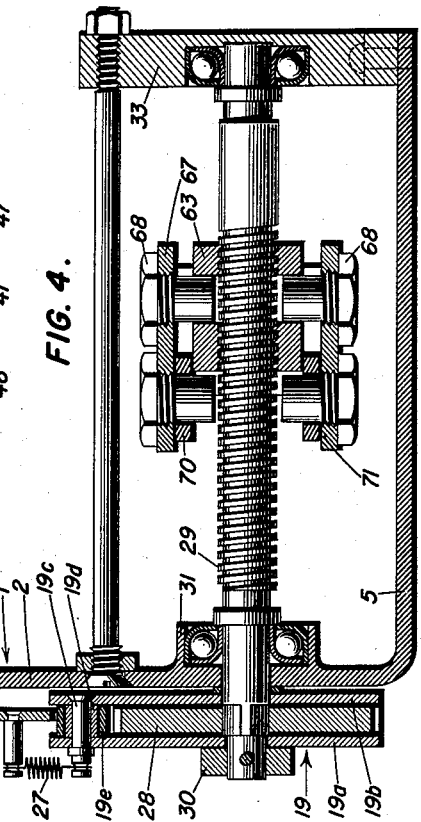
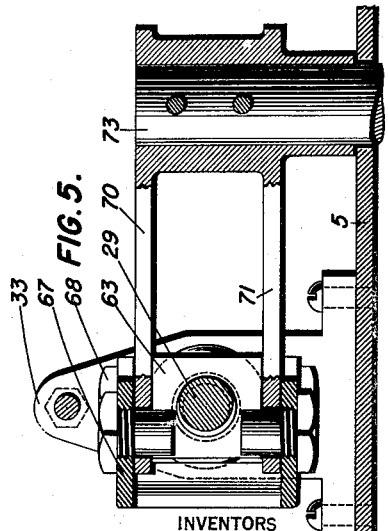
INVENTORS
*EMMETT C. BAILEY*
*WESLEY SPANGENBERG*
BY
ATTORNEY

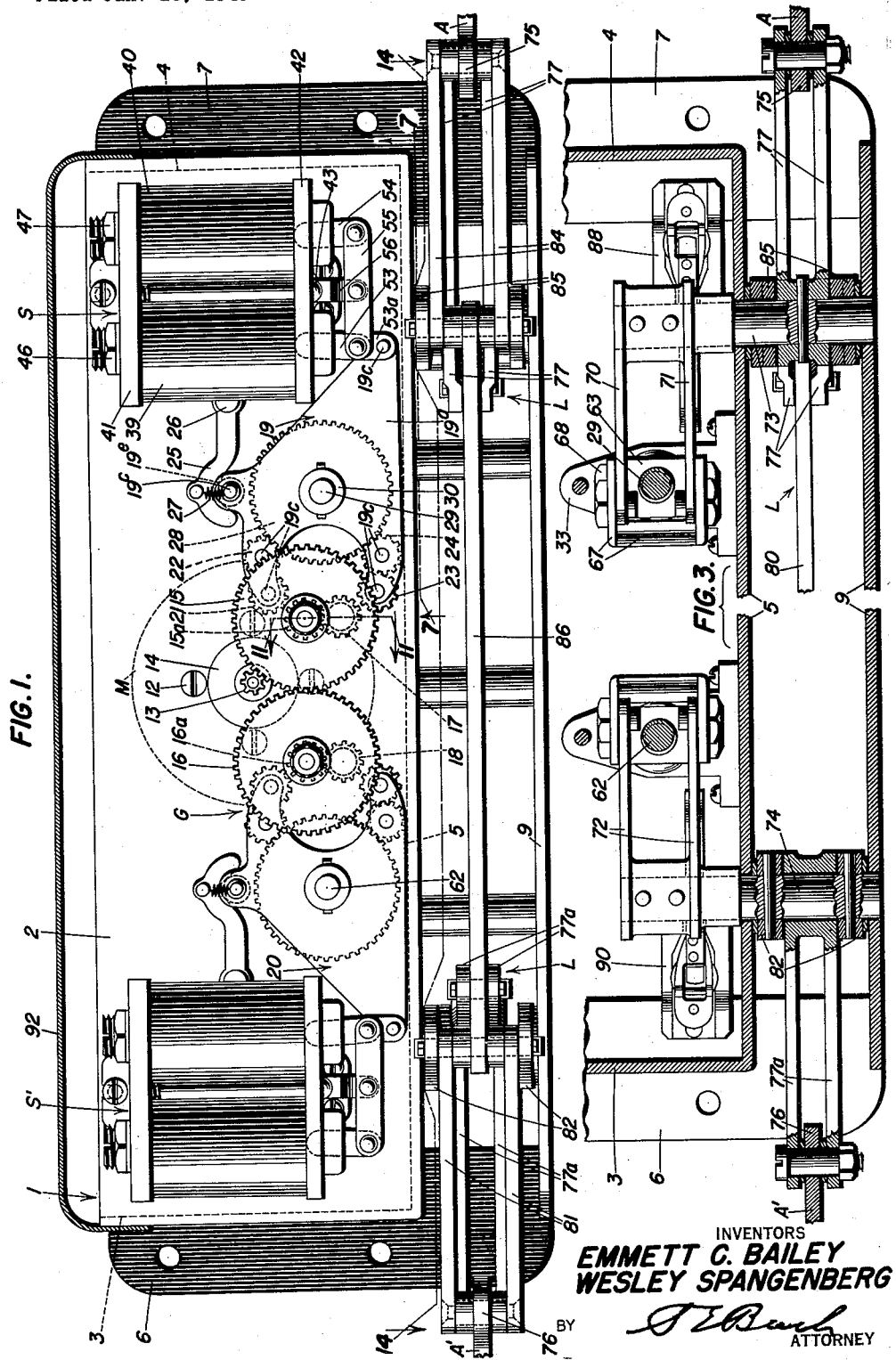

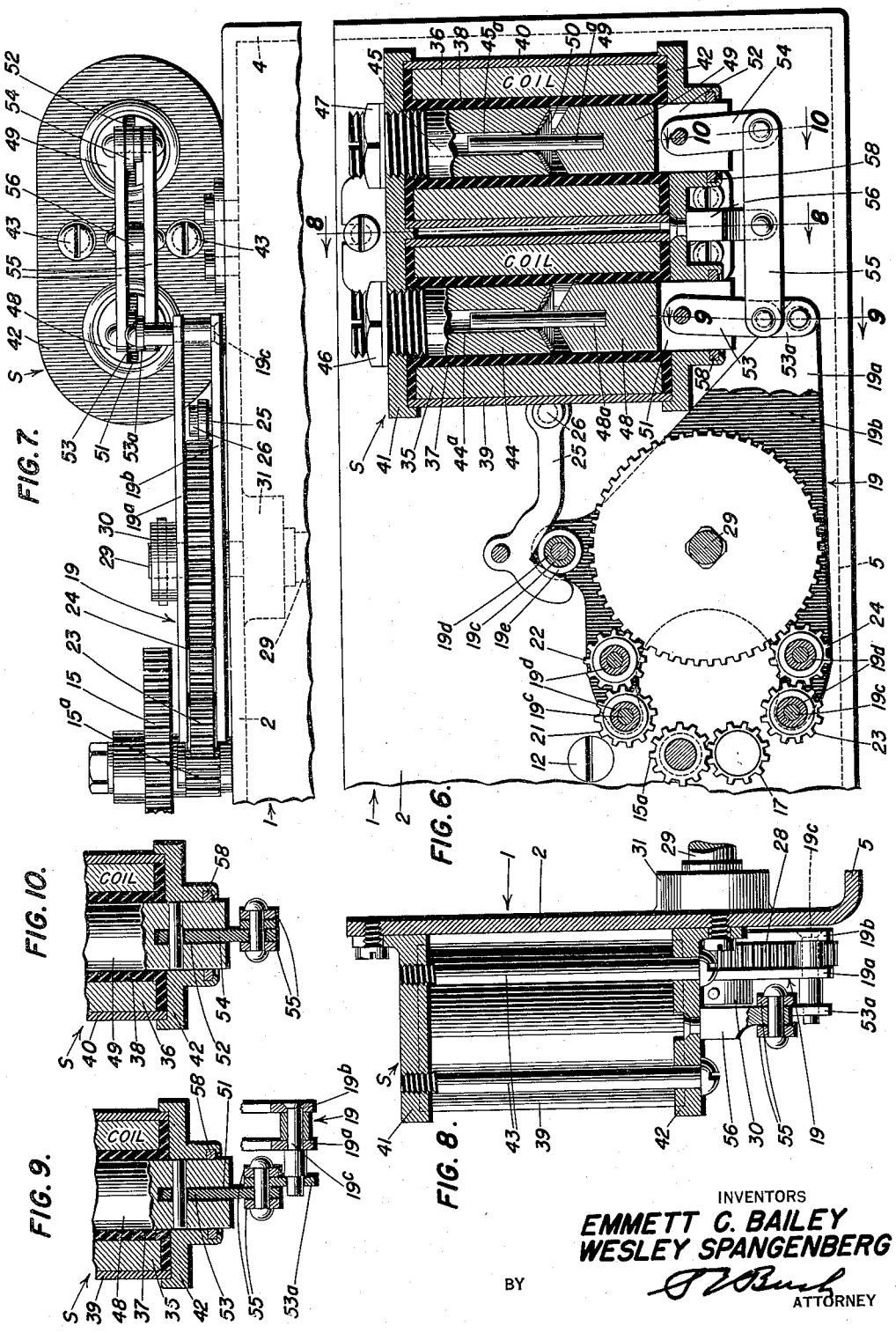
Nov. 8, 1960 — E. C. BAILEY ET AL — 2,959,066
MOTOR-TRANSMISSION SYSTEM
Filed Jan. 18, 1945 — 7 Sheets-Sheet 3
INVENTORS
EMMETT C. BAILEY
WESLEY SPANGENBERG
BY
ATTORNEY

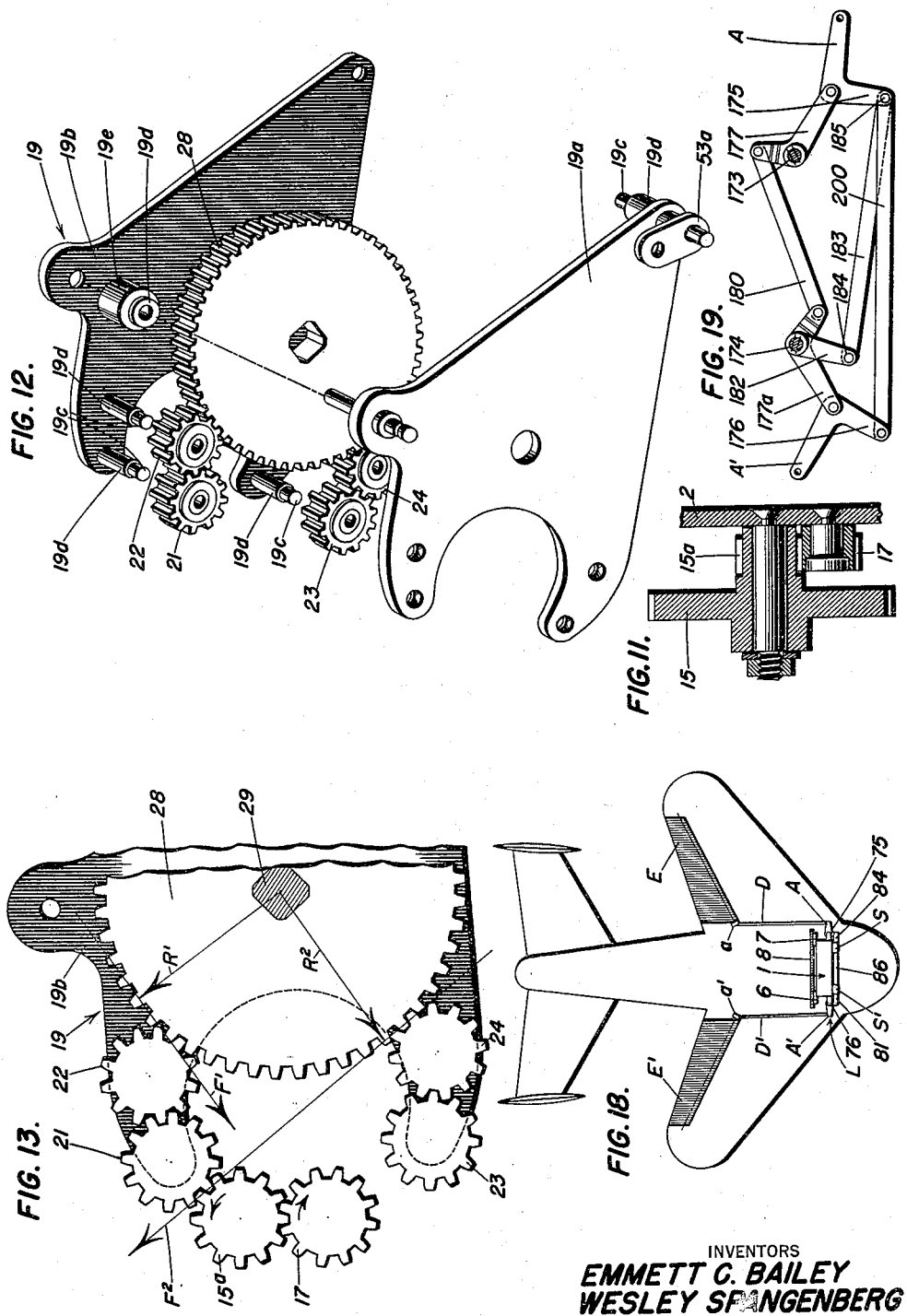

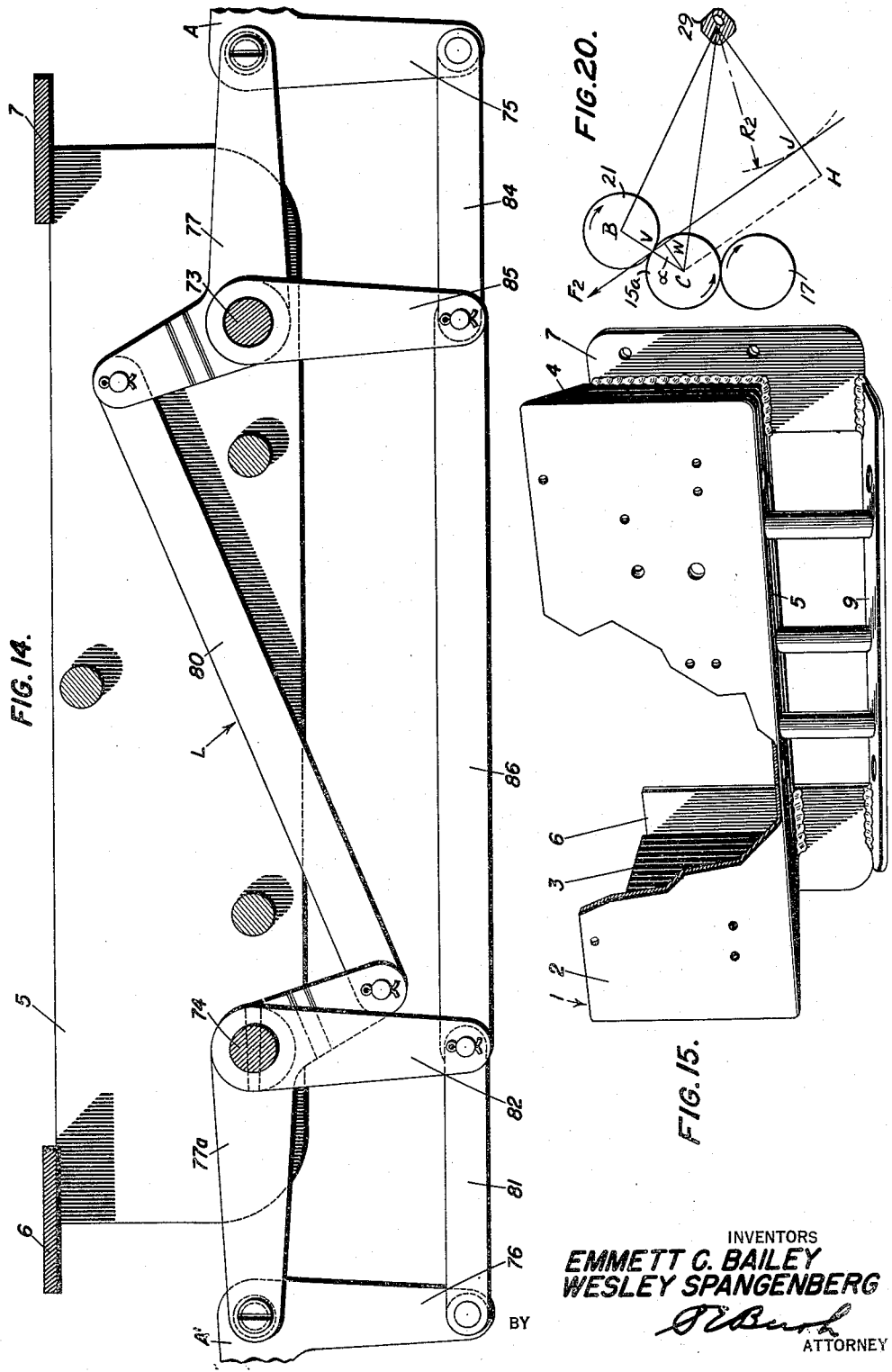

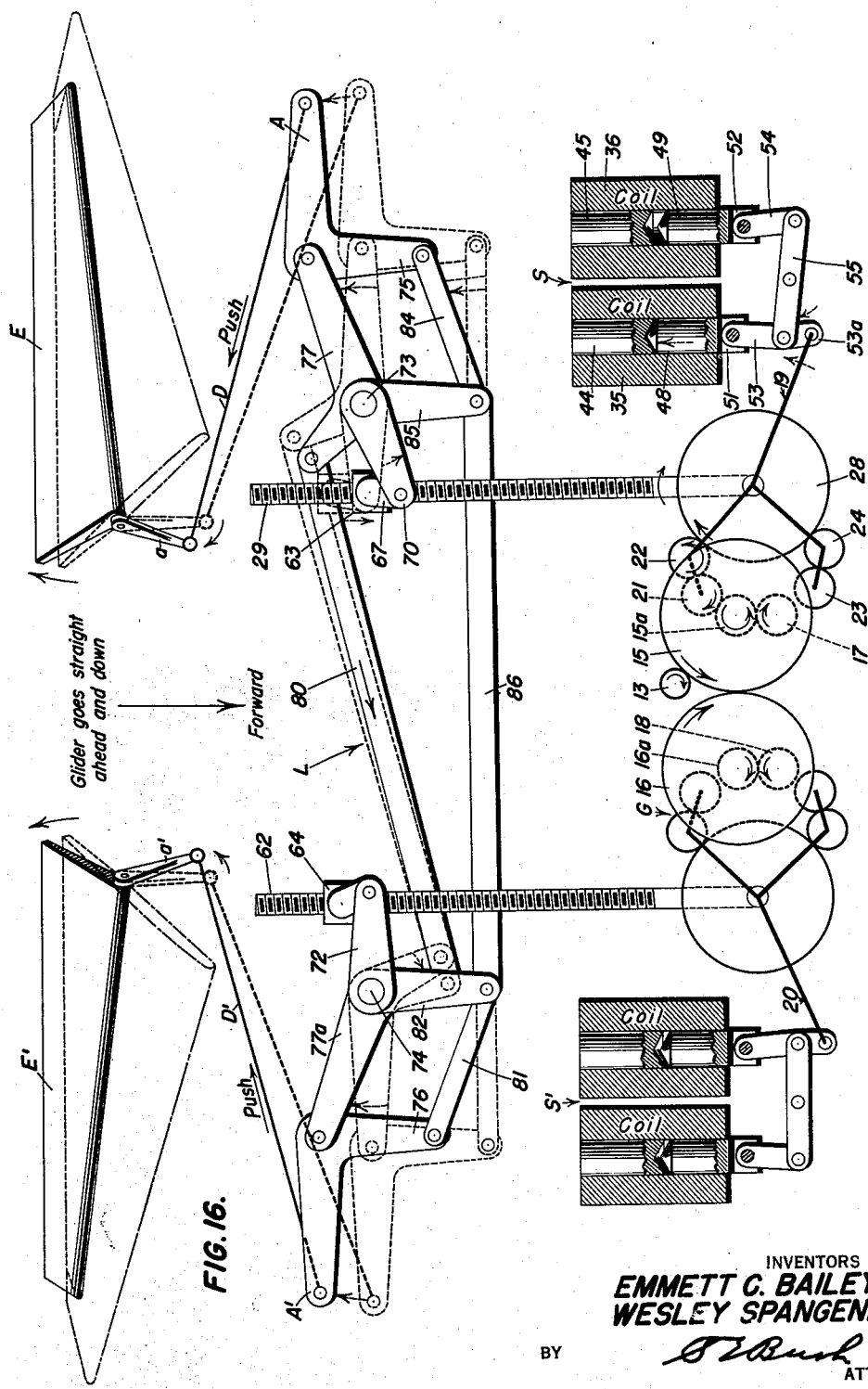

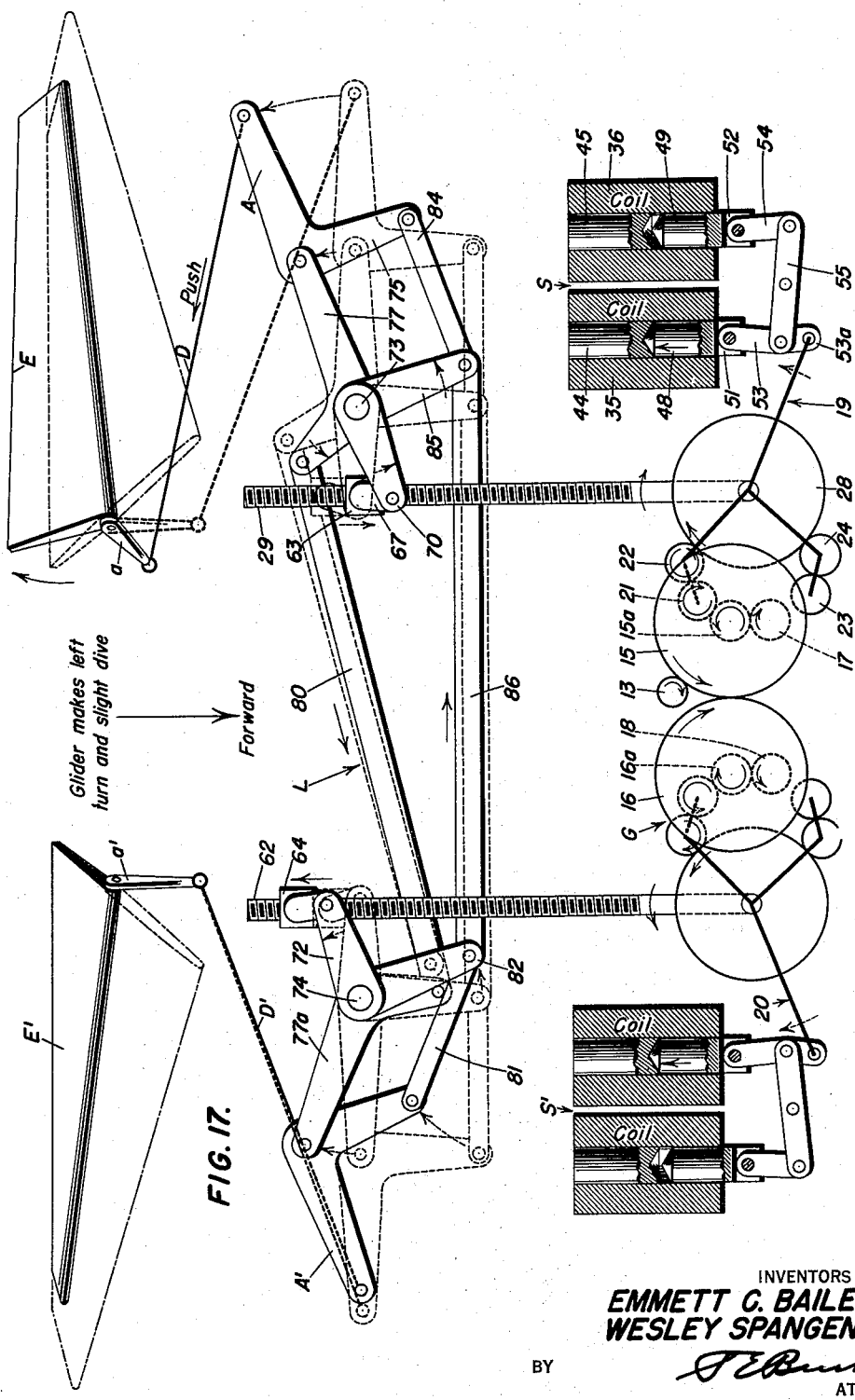

2,959,066
Patented Nov. 8, 1960

2,959,066
MOTOR-TRANSMISSION SYSTEM

Emmett C. Bailey, Washington, D.C., and Wesley Spangenberg, Takoma Park, Md., assignors to the United States of America as represented by the Secretary of the Navy Filed Jan. 18, 1945, Ser. No. 573,398

7 Claims. (Cl. 74—469)

(Granted under Title 35, U.S. Code (1952), sec. 266)

This invention relates to power drive mechanisms. The invention has as its primary object the provision of simple, compact and efficient means for producing a variety of motions, by means of which two distinct objects, as for example the control surfaces of an airplane, may be moved either independently of one another or in an interrelated manner.

Another important object of the invention is to provide such a mechanism adapted to furnish power actuation of the control surfaces of an airplane of the type disclosed in the copending application of William Hunter Ayres Boyd, Serial No. 524,431, filed Feb. 29, 1944, now abandoned, wherein two movable control surfaces are provided for controlling the flight path of the aircraft and its lateral stability, the control surfaces consisting of two elevons, one located in each wing. More specifically the present invention provides means whereby (1) both elevons may be moved upward simultaneously, or (2) both may be moved downward simultaneously, or (3) either elevon may be moved upwardly while the other is moved downwardly, or (4) either elevon may be held stationary while the other is moved either upwardly or downwardly.

Still another object is to provide such a power drive system capable of transmitting any of the aforesaid movements or combinations of movements but which is powered by a single unidirectional motor.

Still another object is to provide a power drive system which includes a novel gearing and reversing system, in which the gear reactions are so balanced one against the other as to permit a small operating force to effect the clutching and declutching of gears which are capable of transmitting a relatively large torque.

The present invention also includes among its more specific objects the provision of a novel gearing system including a shiftable gear carrier adapted to be moved to either side of a neutral position to establish a geared driving connection in either direction and which incorporates a novel synchronizing arrangement eliminating clashing of the gears.

Another object is to provide a novel system of linkage for the derivation of the several relative motions listed above.

Fig. 1 is a front elevational view of a device incorporating the principles of the present invention, with a part of the casing removed.

Fig. 2 is a top plan view of the same, also with cover removed;

Figs. 3, 4, 5, and 6 are sectional views taken substantially on the lines 3—3, 4—4, 5—5, and 6—6, respectively, of Fig. 2, and looking in the directions of the arrows;

Fig. 7 is a fragmentary inverted plan view taken as indicated by the line and arrows 7—7 of Fig. 1, showing one of the solenoids together with portions of the linkage and gearing;

Figs. 8, 9, and 10 are detailed sectional views taken substantially on the lines 8—8, 9—9, and 10—10, respectively, of Fig. 6, and looking in the directions of the arrows;

Fig. 11 is a sectional detail taken substantially on the line 11—11 of Fig. 1, and looking in the direction of the arrows;

Fig. 12 is a partially exploded perspective view of one of the gear carriers, together with the gearing carried thereby;

Fig. 13 is a diagrammatic view of the gearing carried by and directly cooperating with one of the gear carriers, illustrating the torque reactions of the gears and the resultant effect upon shifting of the gear carrier;

Fig. 14 is a top plan view of the linkage, corresponding to a horizontal section taken substantially of the line 14—14 of Fig. 1, and looking in the direction of the arrows;

Fig. 15 is a perspective view of the supporting frame or chassis, partially broken away;

Fig. 16 is a diagrammatic view of the entire power transmission system and interconnected elevons, showing the parts in the positions they assume when both elevons are simultaneously elevated;

Fig. 17 is a similar diagrammatic view showing the parts in the positions they assume when one of the elevons is raised and the other held stationary;

Fig. 18 is a diagrammatic plan view of a glider provided with power driving means constructed in accordance with the present invention for operating the control surfaces thereof;

Fig. 19 is a diagrammatic plan view of a modified linkage arrangement; and

Fig. 20 is a diagrammatic view of the gearing illustrating the mathematical considerations involved in determining the position of the carrier-mounted gear.

The principal components of the preferred form of the invention illustrated in Figs. 1 to 18 inclusive of the drawings comprise (1) a motor M, constituting the sole source of power and which constantly rotates in one direction while the system is in operation, (2) gearing, best shown in Fig. 1 and generally designated G, which serves the several functions of torque and speed conversion, division of the drive into two trains, and the provision of individual reversing means for each such train, (3) electromagnetic gear shifting means S, S′, (4) a novel linkage system, generally designated L, constituting motion translating means, and which insures a desired coordinated interrelation of the motions imparted to (5) the two power arms A, A′, by which the elevons E, E′ constituting the control surfaces of the aircraft are moved to direct its flight and control its lateral stability.

The general mounting of the unit in the aircraft, and the manner in which the power arms are connected to the elevons to actuate the latter, are best shown in Figs. 16, 17, and 18.

All of the components are carried by a box-like sheet metal frame or chassis 1 (Fig. 15), having a front wall 2, side walls 3, 4, and a pair of spaced bottom or floor plates 5, 9. Mounting brackets 6, 7 are provided at either end of the chassis for mounting the same upon a transverse bulkhead as 8 of the aircraft. The aircraft for which the preferred unit disclosed herein is particularly designed is illustrated in Fig. 18 as of the type, disclosed in the Boyd application above referred to, wherein the ship is caused to climb by depressing both elevons, E, E′, to dive by raising both elevons, to turn by raising one elevon while depressing or holding the other stationary, and in which lateral trimming is effected by raising one elevon and lowering the other. The motor and the screw drives which constitute the last elements of the gear trains are contained within the enclosure of the walls 2, 3, 4, and 5, while the linkage is arranged between the floor plates 5 and 9, and the remainder of the gearing and the gear shifting solenoids are mounted on the front wall 2.

The motor M is mounted by means of screws 12 approximately centrally of the front wall 2 as shown particularly in Figs. 1 and 2 and carries on the outer end of its shaft the drive pinion 13. A centering boss 14 on the front end of the motor casing is fitted in an aperture in the front wall 2 to locate the motor. Pinion 13 meshes with idler gear 15, which rotates on a bearing post fixed in the wall 2. Gear 15 drives similar gear 16 also journaled on a post fixed to the wall 2 and arranged on the opposite side of gear 13. Gears 15 and 16 constitute the first gears of two reduction trains, each of gears 15, 16 having a smaller gear 15a and 16a, respectively, formed integrally therewith and constantly meshing with a reversing pinion 17, 18, the reversing pinions being mounted on shorter bearing posts located directly beneath the bearing posts of gears 15, 16 as shown in Fig. 1.

Cooperating with each pair of gears 15a—17 and 16a—18 is a gear carrier 19, 20. Since these are alike (but symmetrically reversed) description of one (19) will suffice. Front and back plates 19a, 19b of the carrier 19 are fixed in spaced alignment by a plurality of rivets as 19c, each of which is surrounded by a bearing and spacer sleeve 19d serving as a support for one of the gears 21, 22, 23, 24, and the roller 19e. Roller 19e in cooperation with detent arm 25 serves as yieldable centering means for the carrier, normally maintaining it in a centered position in which the pinions 21, 23 carried by the extremities of its forked arms are free of the gears 15a, 17. Detent arm 25 is pivoted at 26 on the front plate 2 and biased downwardly by the spring 27 extending between the arm 25 and carrier plate 19. Gears 21 and 23 mesh with the gears 22 and 24, respectively, and the latter are in continuous mesh with the large gear 28 which is keyed to shaft 29 as by appropriate squared portions, the gear and the carrier assembly being held on the end of the shaft by a pinned collar 30. It will be seen that gear 28 and shaft 29 may be driven in one direction by rocking the carrier from the centered position in which it is shown in Fig. 6 to bring gear 21 into mesh with gear 15a and in the opposite direction by rocking the carrier to bring gear 23 into mesh with gear 17.

A ball bearing holder 31 carried by the front wall 2 (Fig. 4) supports the forward ball-bearing for shaft 29, the rear end of which shaft is supported by a ball-bearing in a pedestal 33 mounted on the floor plate 5.

The solenoid shifter assemblies S, S′ referred to above function to rock the carriers 19, 20, respectively. Each such assembly includes a pair of solenoid coils as 35, 36 (Fig. 6). When both of these are deenergized the carrier remains in the centered position in which the drive is interrupted, while the selective energization of the coils permits rocking the carrier in either direction for opposite drives as noted above. The construction of the coil assemblies is clearly shown in Figs. 6, 7 and 8. Each coil is wound on a cylindrical form of insulating material 37, 38, and sheathed by a metal cylinder 39, 40. The end caps 41, 42 are held together by screws 43 which extend through cap 42 and are threaded into cap 41. The solenoid cores are of iron and comprise adjustable stationary portions 44, 45 threaded through cap 41 and locked in place by nuts 46, 47, and slidable armature portions 48, 49. The armatures are smaller than the bores in which they travel and centered, to prevent rubbing contact over the entire surface area, by non-magnetic central guide rods 48a, 49a extending from the upper ends of the armatures into central bores 44a, 45a in the stationary cores, and by non-magnetic guide rings 58 held in and projecting inwardly from the bores in the lower end cap 42 through which the armatures project. Suitable non-magnetic washers indicated at 50 serve to absorb the impact of the armature sections against the stationary cores and also to reduce the effects of residual magnetism. The projecting ends of the armatures are slotted at 51, 52 and have loosely pinned in the slots the links 53, 54 which are connected by a rocking lever 55 pivoted on a post 56, centrally mounted on cap 42. An extension link 53a of link 53 connects the solenoid armature linkage to the gear carrier 19.

Carrier 20 together with its gearing and shifting means constitutes similar means for driving and for controlling the direction of rotation of a shaft 62 arranged in similar position to the shaft 29 but near the opposite end of the assembly, the position of all of the parts being substantially symmetrical with respect to a vertical longitudinal center plane, as will be apparent. Thus it will be seen that rotation of motor gear 13 may be transmitted to either or both of shafts 29 and 62 so that the latter may rotate together in the same or opposite directions or may rotate singly in either direction depending upon the energization of the solenoids.

Fig. 13 shows the relative positions of the gears in the carrier and also the driving gear 15a and the reversing gear 17, gear 21 being engaged with gear 15a to impart clockwise rotation to gear 28 and shaft 29. The driving force on gear 21 supplied by the gear 15a and represented by the arrow $F_2$ acts on the gear carrier at an effective radius indicated by the arrow $R_2$, in a direction to tend to disengage the gears. This disengaging torque is equal to the product $F_2R_2$ and tends to rotate the gear carrier in a clockwise direction. Hence to keep the gears engaged a torque of this magnitude must be applied to the gear carrier in a counter-clockwise direction. By the incorporation of the gear 22 in the gear carrier between the gears 21 and 28 this counterbalancing torque on the gear carrier is introduced, since the reactive force of the gear 22 rotating in a counter-clockwise direction is a force, represented by arrow $F_1$, acting on the carrier in the counter-clockwise direction. Neglecting the frictional force necessary to drive the gears 21 and 22, the tooth load between gears 22 and 28 is the same as that between gears 21 and 15a, i.e., $F_1$ will be equal to $F_2$.

The reactive force $F_1$ will be directed through the pitch point along the line of contact between gears 22 and 28 and hence at a radius $R_1$ from the pivot point of the gear carrier. The radius $R_1$ is therefore fixed once the size of gear 28 is fixed. $F_2$ is directed in like manner through the pitch point along the line of contact between the gears 21 and 15a, but by selecting the pitch point along the pitch line of gear 15a the direction of the force $F_2$, and hence the length of its effective radius of application $R_2$, may be varied. By the proper selection of the pitch point, the torque $F_2R_2$ may be made to bear such relationship to the reactive torque $F_1R_1$ as may be desired. If the radius $R_2$ is made less than radius $R_1$, the disengaging torque $F_2R_2$ will be less than the engaging torque $F_1R_1$ and a force would be required to pull the gears from engagement. The frictional losses in the gears 21 and 22 tend to make $F_2$ slightly greater than $F_1$, so that once these losses are determined proper allowance may be made. In our preferred embodiment the design is such as to make $R_2$ very slightly greater than $R_1$ and resultantly the disengaging torque $F_2R_2$ very slightly greater than the active torque $F_1R_1$. This assures prompt and automatic declutching when the solenoid is de-energized. The solenoid, on the other hand, needs to supply only a comparatively small force to keep the gears in engagement, namely, the difference between the disengaging and engaging torques.

Upon reference to Fig. 13 it will be seen that if the position of the drivable gear 21 were changed (within limits) by rolling it around the periphery of the driving gear 15a in a counterclockwise direction to a new position farther to the left as viewed in the figure, the direction of $F_2$ would change in a manner to decrease $R_2$; and conversely, if the drivable gear were placed to engage the driving gear at a point displaced in the opposite direction the length of $R_2$ would be increased.

In the particular arrangement of gearing in this device, $R_2$ was chosen of a length such that if $F_3$ denotes the sum of the frictional drags of the drivable and idler gears 21, 22, the two counterbalancing moments would have the mathematical relationship:

$$(F_2+F_3)(R_2) > F_1 R_1$$

by an amount less than the resisting moment supplied by the solenoid.

After the proper value of $R_2$ is determined by the design considerations, the position of the drivable gear with respect to the pivot point of the carrier and the driving gear may be determined by the following mathematical considerations:

Referring to Fig. 20:

OB=radial distance of drivable gear from pivot point of carrier. OB determines the location of the drivable gear with respect to the pivot point without regard to the position of the carrier with respect to the driving gear.

OC=radial distance of the driving gear from the pivot point of the carrier. OC fixes the location of the driving gear with respect to the pivot point of the carrier without regard to the position of the carrier with respect to the drivable gear. The pitch point of the driving gear and drivable gear can be changed only by a change in OB or OC. For the purpose of this derivation OC will be assumed to be fixed by the geometrical considerations of the gears chosen and OB will be variable to change the relationship of the driving gear and drivable gear.

CV=pitch radius of driving gear. CV can be varied only by changing the size of the driving gear.

VB=pitch radius of drivable gear. VB can be varied only by changing the size of the drivable gear.

Hence $CB=CV+VB=$ the sum of the pitch radii of the driving and drivable gears.

Angle $WCV=\alpha=$pressure angle of the gears chosen and is therefore fixed once the particular type of gear tooth to be used is chosen.

CW is perpendicular to $F_2$ and is by definition equal to the radius of the base circle of the driving gear.

Angle OCB is the angle between the line connecting the pivot point of the carrier with the center of the driving gear and the line connecting the center of the driving gear with the drivable gear when the drivable gear is in meshing engagement with the driving gear.

$R_2$=radius at which the line of action $F_2$ acts upon the gear carrier. $R_2$ is therefore perpendicular to $F_2$.

By the law of cosines it will be seen that (1)   $OB^2 = OC^2 + CB^2 - 2(OC)(CB) \cos OCB$ in which OC and CB are fixed once the driving gear is located, by pure geometrical considerations and once the diameters of the driving and drivable gears are chosen.

Angle $OCB = OCW + WCV$
Angle $OCW = COH$ because $R_2$ is parallel with $CW \cos OCB$
$= \cos (OCW + WCV)$
$= \cos OCB = \cos OCW \cos WCV - \sin OCW \sin WCV$ To determine cos OCW construct CH parallel with $F_2$ and extend $R_2$ at J, which makes $HJ=CW$.

Then $$\cos OCW = \cos COH = \frac{R_2+HJ}{OC} = \frac{R_2+CW}{OC}$$

$$\cos WCV = \frac{CW}{CV}$$

$$\sin OCW = \sqrt{1-\cos^2 OCW} = \sqrt{1-\left(\frac{R_2+CW}{OC}\right)^2}$$

$$\sin WCV = \sqrt{1-\cos^2 WCV} = \sqrt{1-\left(\frac{CW}{CV}\right)^2}$$

then $$\cos OCB = \left(\frac{R_2+CW}{OC}\right)\frac{CW}{CV} - \sqrt{1-\left(\frac{R_2+CW}{OC}\right)^2}\sqrt{1-\left(\frac{CW}{CV}\right)^2}$$

or by simplification $$\cos OCB = \frac{CW(R_2+CW) - \sqrt{OC^2-(R_2-CW)^2}\sqrt{CV^2-CW^2}}{(OC)(CV)}$$

and by substituting in (1)

$$OB^2 = OC^2 + CB^2 - \frac{2CB}{CV}[CW(R_2+CW)$$
$$-\sqrt{[OC^2-(R_2+CW)^2][CV^2-CW^2]}]$$

which can be reduced to the form $OB^2 = K_1 - K_2 R_2$ from which it can be seen that $R_2$ varies with OB in such a manner that if OB is increased, $R_2$ will decrease to zero and then reach a maximum negative value.

It will likewise be seen that if OB is decreased, $R_2$ will be increased until it reaches a positive maximum.

With the gearing arrangements shown, it will also be noted that as the gear 21 is brought into engagement with the gear 15a by counterclockwise rotation of the gear carrier, clockwise rotation is imparted to gear 21 as gear 22 rolls about the periphery of gear 28, which under this condition is at rest. The engaging teeth of gear 21 will therefore be moving in the same direction as the engaging teeth of the driving gear 15a. The velocity of movement of the carrier is preferably such that during movement of the gears into engagement, the angular velocity of gear 21 equals the angular velocity of gear 15a. The gears are thus synchronized and the teeth are fully engaged before they are required to transmit power.

Although 14½ degree involute gear teeth are shown, specially designed pointed teeth could be used if desired. At speeds of the drive and reverse gears 15a, 17 up to approximately 3000 r.p.m., special gear teeth have not been found necessary.

While the above description has been confined to the engagement of gear 21 with gear 15a resulting in the driving of the gear 28 in a clockwise direction, gear 23 is obviously engageable in similar manner with gear 17 to impart counter-clockwise rotation to gear 28. Since the arrangement of the gears is symmetrical about the horizontal axis of the gear carrier, similar force reactions are imparted to the gear carrier in an identical manner but directed oppositely.

Shafts 29 and 62 are formed intermediate their ends as screws and each carries threaded thereon a traveler nut, as 63, 64, longitudinally moveable by rotation of its screw. Referring to Figures 4 and 5 showing in detail the parts appurtenant the nut 63 and bearing in mind that similar parts are provided in connection with nut 64, it will be noted that a U-shackle 67 having top and bottom plate portions is pivoted to the traveler. Trunnion studs 68 project from the shackle in which they are threadedly secured, into holes in the traveler nut, while similar studs pivotally connect the shackle at its other end to a crank composed of spaced upper and lower arms 70, 71 united to a hub pinned to a shaft 73 extending thereinto. Nut 63, when actuated by rotation of the screw shaft 29, rotates the vertical shaft 73. A duplicate mechanism transmits rotation from screw shaft 62 to shaft 74 through an arm 72.

The details of the linkage, L, through which the rotation of shafts 73 and 74 is transmitted to the parallelogram systems comprising arms 75, 77, 84, 85; and 76, 77a, 81, 82 of the remote control unit, are shown in Figs. 14, 16 and 17. Fast upon shaft 73 is an obtuse-angled double-armed bellcrank type lever 77. The longer arm of bellcrank 77 is pivoted to a bellcrank formed of elevon operating arm A and the integral forwardly projecting work arm 75, at the junction of the arms.

The shorter arm of bellcrank 77 is pivotally connected by link 80 to the short arm of a bellcrank type lever 77a which is similar to bellcrank 77 but inverted in position and loose upon shaft 74. The longer arm of bellcrank 77a extends outwardly and is pivotally attached to the bellcrank comprising elevon operating arm A′ and work arm 76, mounted with its arm A′ projecting outwardly similarly to bellcrank A–75 but on the opposite side of the unit. Arm 76 is connected by a link 81 to crank 82 which is pinned to shaft 74. A similar link 84 pivotally connects the arm 75 with an arm 85 which is free on shaft 73. Crank 82 and arm 85 are joined at their outer ends by a link 86. The bellcranks A–75, A′–76 are thus supported by individual parallelogram systems, these two systems being interconnected by the diagonal and transverse links 80, 86. The extremities of A, A′ are linked to the elevons by drag links D, D′ and lever arms a, a′.

From the foregoing and by reference to Fig. 16 it will be seen that rotation of shaft 73 in the counter-clockwise direction, for example, while shaft 74 remains stationary, will simultaneously collapse both parallelogram systems in opposite directions in translating the elevon operating arm A rearwardly, moving the link 80 to the left, as viewed in Fig. 16, moving the longer arm of bellcrank 77a rearwardly, and translate the elevon operating arm A′ aft. Both elevons are accordingly raised, tending to cause the ship to dive without turning laterally. Similarly, clockwise rotation of 73 will result in forward translation of arms A and A′ to induce climbing of the ship. Clockwise movement of shaft 74, while shaft 73 remains stationary and the unit is as shown in Fig. 16, will on the other hand simultaneously expand both parallelogram systems in the same direction to move the outer end of arm A′ aft through arms 82 and 81, at the same time moving outer end of arm A forward through the movement of members 86 and 84. Rotation of shaft 74 in a counter-clockwise direction will move the outer end of arm A′ forward and the outer end of arm A aft. The parallelism of the equal arms 77a and 81, and 77 and 84 insures substantially equal travel of the outer ends of the elevon operating arms for equal angular displacement of shafts 73 and 74. Simultaneous rotation of the latter shafts produces forward or rearward movement of the outer end of one or the other of arms A, A′ at an increased rate while the opposite operating arm remains substantially stationary.

As shown in Fig. 17, simultaneous rotation of both of the shafts 73, 74, in a counterclockwise direction, as viewed from above, raises the port elevon while allowing the starboard elevon to remain substantially stationary the resultant positions of the combined actuation of the two linkages between the parallelogram systems. The operating arm A is thereby moved aft more rapidly and farther than when actuated by rotation of only one of the shafts 73, 74, since it is moved both by the bell crank 77 and by the crank 82, which actuates it through the agency of the links 86, 84 to increase its rearward travel. On the other hand the counterclockwise rotation of crank 82 tends to move the outer end of arm A′ forward while it is at the same time urged aft by the motion imparted thereto through link 80. The starboard parallelogram system assembly accordingly collapses, inclining outwardly and rearwardly as shown in Fig. 17, in such manner that the outer end of its elevon operating arm remains substantially stationary. When both of the shafts 73, 74 are revolved clockwise, the port elevon is depressed while the starboard elevon remains stationary, as will be apparent, while rotation of the shafts in opposite directions results in holding the port elevon stationary while raising or lowering the starboard elevon, the direction of the latter motion depending upon the directions in which the shafts are rotated.

It will be seen from the foregoing that the elevons or control flaps E, E′ may be given any desired relative motion required to control both the flight path and the lateral trim of the ship by energization of the appropriate solenoids singly or jointly.

Limit switches are provided, as indicated at 87, 88, 89, and 90 having pivoted arms disposed in the path of movement of the arms 70, 72, to interrupt energization of the solenoids when a safe extremity of movement of the work arms has been reached. A metal cover 92 is also provided to electrically shield the apparatus and protect it from the weather.

In the modified linkage arrangement shown in Fig. 19, substantially similar action is secured with a somewhat simpler assembly. Similar bellcranks comprising elevon operating arms A, A′ and work arms 175, 176 are employed to actuate driven elements such as the elevons of an aircraft of the type referred to above. The two bellcranks are movable bodily in a manner essentially translatory by means of a driving bellcrank 177 analogous to the bellcrank 77 of the embodiment first described, operable by a driving shaft as 173 and connected at its outer end to the bellcrank A, 175 while its inner, shorter arm is attached to a motion reversing link 180 which actuates the bellcrank A′, 176 through an intermediate bellcrank 177a. The parts thus far described will be seen to be fully equivalent to those of the first embodiment for effecting opposite synchronous pivoting of levers 177 and 177a. In lieu of the three links 81, 86, 84, however, a single rigid link 200 is articulated to the ends of the work arms 175, 176 and so maintains the bellcranks A, 175 and A′, 176 in essentially parallel relation. When the last mentioned bellcranks are to be pivoted in the same direction about their supporting pivots, power is applied to the ends of arms 175, 176 through the agency of a driving arm 182 secured to and drivable by the shaft 174 (which corresponds to the shaft 74 of the first embodiment) and link 183 connected to pivot 185 of arm 175, while link 200 transmits the motion to arm 176.

The invention herein described may be manufactured and used by or for the Government of the United States of America for governmental purposes without the payment of any royalties thereon or therefor.

We claim:

1. Means for moving and for controlling the relative movement of a pair of deflectable elements, comprising two linkage systems each of generally parallelogram form, each such system having one located and at least three movable axes, means operatively connecting one of said deflectable elements to a free side of one of said systems, means operatively connecting the other of said deflectable elements to a free side of the other of said systems, means acting concentrically with respect to the located axis of one of said systems to swing one of the sides thereof about said located axis, means providing connection between said last mentioned side and the corresponding side of the other system to transmit motion from one to the other in the same direction, means acting concentrically with respect to the located axis of the other of said systems to swing another of the sides of the latter about said last mentioned located axis, motion-reversing means providing connection between said last-mentioned side and the corresponding side of the other system to transmit motion from one to the other in the opposite direction.

2. Means for moving and for controlling the relative positions of a pair of deflectable elements with respect to each other, comprising two systems each of generally parallelogram form and including four arms each pivotable with relation to adjacent arms, a corner of each system being fixed in its spatial relation to a corresponding corner of the other system, a linkage connecting a side of one system with a side of the other system for simultaneously collapsing or simultaneously expanding said systems in opposite directions, a linkage connecting a second side of one system with a second side of the other system for simultaneously collapsing or simultaneously expanding said systems in the same direction, an operating arm extending from one parallelogram arm of each system and being linked to the deflectable elements, and means for actuating said two linkages to position the deflectable elements in resultant positions as determined by said actuating means.

3. Means for moving and for controlling the relative positions of a pair of deflectable elements with respect to each other, comprising two systems each of generally parallelogram form and including four arms each pivotable with relation to adjacent arms, a corner of each system being fixed in its spatial relation to a corresponding corner of the other system, means interconnecting the systems for simultaneously collapsing or simultaneously expanding said systems in opposite directions, a second means interconnecting the systems for simultaneously collapsing or simultaneously expanding said systems in the same direction, and means cooperating with parallelogram system and linked to the deflectable elements for transmitting parallelogram movements to said elements, actuation of said two interconnecting means thereby locating said deflectable elements in resultant positions in accordance with said actuation.

4. Means for moving and controlling the relative positions of a pair of deflectable elements with respect to each other, comprising two bellcranks pivotally secured in spaced relationship, a link arm interconnecting said bellcranks by pivotal union with one arm of each for effecting synchronized pivoting of said two cranks in opposite directions, a work arm pivotally secured to each of the unlinked arms of said bellcranks, a second link arm interconnecting said work arms by pivotal union with the free ends thereof for effecting synchronized pivoting of said work arms about said bellcranks in the same direction, means for actuating said first link arm to pivot said bellcranks and hence said work arms about said second link arm in opposite directions, means for actuating said second link arm to pivot said work arms about said bellcranks in the same direction, and means linking said work arms to the deflectable elements to position the latter in accordance with the actuations of said two link arms.

5. Means for moving and for controlling the relative positions of a pair of deflectable elements with respect to each other, comprising two levers pivotally secured in spaced relationship, a linkage interconnecting said levers by pivotal union therewith for effecting synchronized pivoting of said two levers in opposite directions, a work arm pivotally secured to each of said levers, a second linkage interconnecting said work arms by pivotal union therewith for effecting synchronized pivoting of said work arms about said levers in the same direction, means for actuating said first link arm to pivot said levers and hence said work arms about said first linkage in opposite directions and for actuating said second linkage to pivot said work arms about said levers in opposite directions, and means cooperating with said work arms and linked to the deflectable elements to locate the latter in resultant positions in accordance with the actuations of said two linkages.

6. Means for moving and for controlling the relative positions of a pair of deflectable elements with respect to each other, comprising two levers pivotally secured in spaced relationship, a means interconnecting said levers for effecting synchronized pivoting thereof in opposite directions, a work arm pivotally secured to each of said levers, said work arms being linked to the deflectable elements for moving and controlling them, and a second means interconnecting said work arms for effecting synchronized pivoting of said work arms about said levers in the same direction, actuation of said linkages thereby altering the positions of said work arms to locate said deflectable elements in resultant positions in accordance with the actuations of said two interconnecting means.

7. Means for moving and for controlling the relative positions of a pair of deflectable elements with respect to each other, comprising two levers pivotally secured in spaced relationship, a linkage connecting said levers for synchronized pivoting thereof in opposite directions, a work arm pivotally secured to each of said levers, a second linkage connecting said work arms for effecting synchronized pivoting of said work arms about said levers in the same direction, actuation of said linkage thereby altering the positions of said work arms, and means cooperating with said work arms and linked to the deflectable elements to locate the latter in resultant positions in accordance with the actuations of said two linkages.

References Cited in the file of this patent
UNITED STATES PATENTS

| | | |
|---|---|---|
| 1,174,849 | George | Mar. 7, 1916 |
| 1,576,995 | Prowse | Mar. 16, 1926 |
| 1,736,064 | Walker | Nov. 19, 1929 |
| 1,918,082 | Carlson | July 11, 1933 |
| 2,049,661 | Pederson | Aug. 4, 1936 |
| 2,078,128 | Doran | Apr. 20, 1937 |
| 2,191,842 | Back | Feb. 27, 1940 |
| 2,222,997 | Bellanca | Nov. 26, 1940 |
| 2,264,233 | Batts | Nov. 25, 1941 |
| 2,275,692 | Simms | Mar. 10, 1942 |